United States Patent
Hermann

(10) Patent No.: US 9,114,704 B2
(45) Date of Patent: Aug. 25, 2015

(54) SYSTEM AND METHOD TO PREVENT UNINTENDED VEHICLE TRAVEL

(71) Applicant: FORD GLOBAL TECHNOLOGIES, LLC, Dearborn, MI (US)

(72) Inventor: Thomas J. Hermann, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/295,552

(22) Filed: Jun. 4, 2014

(65) Prior Publication Data

US 2014/0288729 A1  Sep. 25, 2014

Related U.S. Application Data

(62) Division of application No. 13/767,071, filed on Feb. 14, 2013, now abandoned.

(51) Int. Cl.

| | |
|---|---|
| *B60T 8/17* | (2006.01) |
| *B60K 23/00* | (2006.01) |
| *B60T 8/171* | (2006.01) |
| *B60W 10/06* | (2006.01) |
| *B60W 10/10* | (2012.01) |
| *B60W 10/18* | (2012.01) |
| *B60K 28/04* | (2006.01) |

(52) U.S. Cl.
CPC ............. *B60K 23/00* (2013.01); *B60K 28/04* (2013.01); *B60T 8/17* (2013.01); *B60T 8/171* (2013.01); *B60W 10/06* (2013.01); *B60W 10/10* (2013.01); *B60W 10/18* (2013.01); *Y10T 477/647* (2015.01)

(58) Field of Classification Search
CPC ........ B60R 25/08; B60R 25/09; B60R 25/31; B60R 25/32; B60T 7/12; B60W 40/10
USPC ............. 701/48, 110, 112, 116; 180/271, 272
See application file for complete search history.

(56) References Cited

U.S. PATENT DOCUMENTS

| | | | | |
|---|---|---|---|---|
| 4,414,937 | A * | 11/1983 | Ueda et al. .................... | 180/271 |
| 2007/0016353 | A1* | 1/2007 | Bredin ............................ | 701/70 |
| 2012/0018240 | A1* | 1/2012 | Grubaugh et al. .............. | 701/70 |

* cited by examiner

*Primary Examiner* — John Q Nguyen
*Assistant Examiner* — Anshul Sood
(74) *Attorney, Agent, or Firm* — Frank MacKenzie

(57) ABSTRACT

A movement prevention system preventing undesired travel of a vehicle. A transmission gear sensor senses an out of park position of a vehicle transmission. An occupant detection system senses a presence of a driver in a driver seat of a vehicle in response to the vehicle transmission being out of the park position. A processor determines whether movement of the vehicle is likely to occur in response to a determination of the non-presence of the driver. A vehicle movement prevention device prevents movement of the vehicle in response to the processor determining whether movement of the vehicle is likely to occur.

16 Claims, 2 Drawing Sheets

SYSTEM AND METHOD TO PREVENT UNINTENDED VEHICLE TRAVEL

CROSS REFERENCE TO RELATED APPLICATIONS

This application is a divisional application of and claims priority to application Ser. No. 13/767,071 filed Feb. 14, 2013.

STATEMENT REGARDING FEDERALLY SPONSORED RESEARCH

Not Applicable.

BACKGROUND OF INVENTION

The present invention relates to vehicle safety systems.

Vehicles incorporate many different types of safety systems for preventing or deterring a dangerous condition from occurring. For example, a vehicle may have an audible alarm that activates if a driver removes a key from the ignition while the vehicle is still engaged in an out-of-park condition. This provides notification to a driver that the vehicle is capable of moving since the transmission is not in a park position.

While this type of feature helps to mitigate the potential issue of a driver exiting the car with the engine off while the transmission gear is out of the park position, a driver may not notice a warning in some conditions or may ignore it. Moreover, this type of warning will not prevent movement of a vehicle when the driver exits the vehicle with the engine running and the transmission gear not in the park position.

SUMMARY OF INVENTION

In one aspect of the invention, a method is provided is provided for deterring undesired movement of a vehicle. Sensing is performed to determine whether a vehicle transmission is out of a park position. A non-presence of a driver in a driver seat of the vehicle is determined by an occupant detection system in response to the vehicle transmission being out of the park position. A determination is made whether movement of the vehicle is likely to occur in response to a determination of the non-presence of the driver. A vehicle movement prevention device is actuated for preventing movement of the vehicle in response to determining that movement of the vehicle is likely to occur.

In yet another aspect of the invention, a movement prevention system for a vehicle is provided. A transmission gear sensor senses an out of park position of a vehicle transmission. An occupant detection system senses a non-presence of a driver in a driver seat of a vehicle in response to the vehicle transmission being out of the park position. A processor determines whether movement of the vehicle is likely to occur in response to a determination of the non-presence of the driver. A vehicle movement prevention device prevents movement of the vehicle in response to the processor determining that movement of the vehicle is likely to occur.

In yet in another aspect of the invention, a method includes sensing an out of park position of a vehicle transmission. A non-presence of a driver in a driver seat is determined by an occupant detection system in response to the sensed out of park position. A determination is made whether movement of the vehicle is likely in response to determining a non-presence of the driver. A vehicle movement prevention device is actuated for preventing movement of the vehicle in response to the likelihood of vehicle movement.

DETAILED DESCRIPTION

Figure 1:
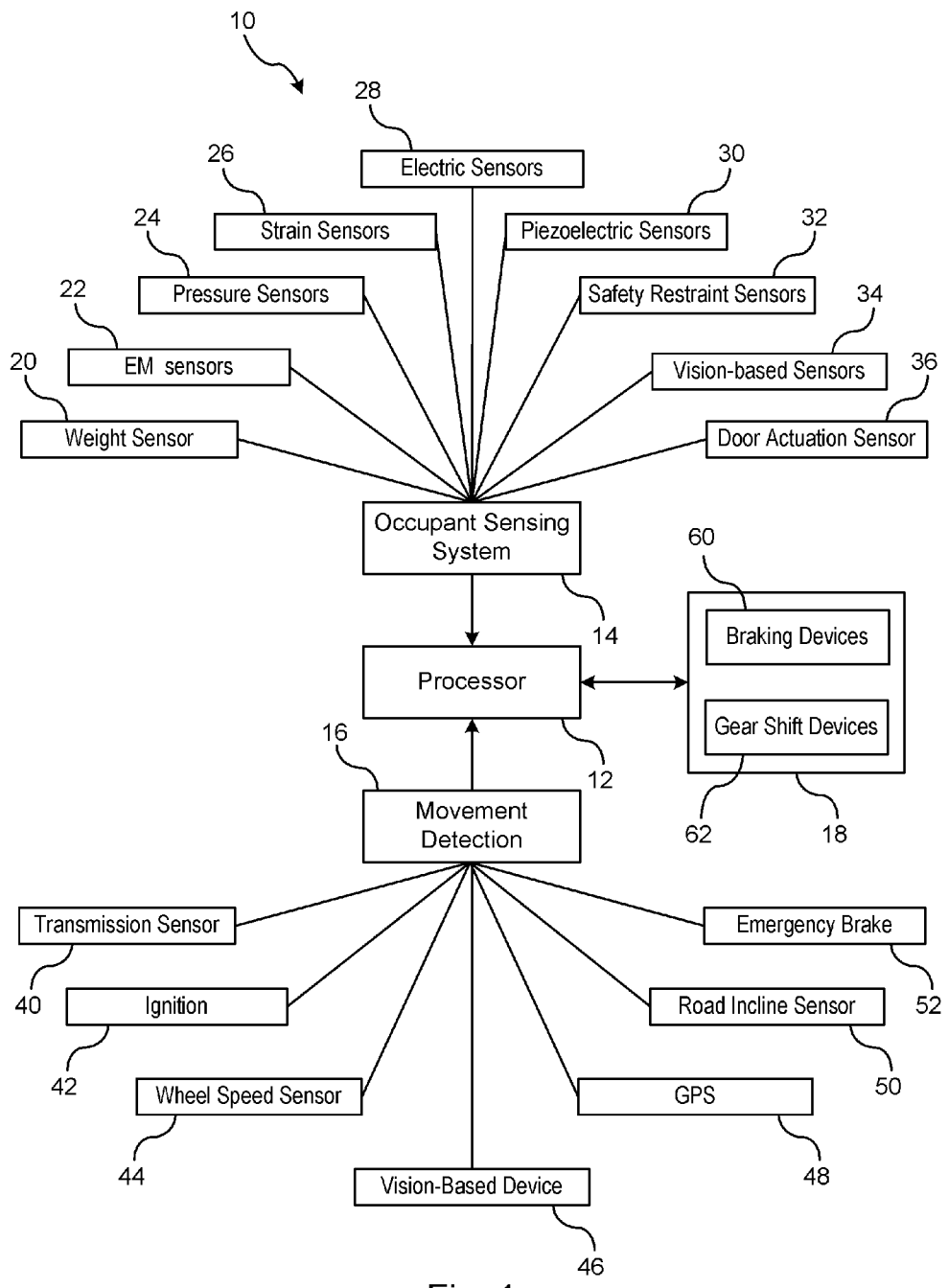
FIG. 1 is a block diagram of a vehicle movement prevention system.

FIG. 1 is a block diagram of a vehicle movement prevention system 10. The system 10 includes a processor 12 for identifying conditions that are present which indicate imminent movement of a vehicle. The processor 12 may be a standalone processor or may be an integrated processor that is used to control one or more vehicle systems. Imminent movement as used herein is defined as actual movement of the vehicle or movement that may occur as a result of the transmission gears being out of a park position and the driver of the vehicle is not seated in the driver seat.

The system 10 further includes an occupant detection system 14, at least one vehicle movement indication device 16, and vehicle movement prevention devices 18.

The processor 12 is preferably an in-vehicle processor. Alternatively, the processor 12 may be a remote processor which is part of a wireless information/navigation service. The processor 12 retrieves data from various sensing devices and determines whether imminent movement of the vehicle is present. The processor 12 sends signals to various control devices for deploying counter-measures to prevent the vehicle from moving.

Preferably, the processor 12 may be the same processor as used by the occupant detection system or other vehicle system. This alleviates the requirement for additional hardware and reduces cost.

The occupant detection system 14 may include any device that can sense the presence of the driver in the driver seat. The occupant detection system 14 generates a signal indicating whether or not the driver is seated in the driver's seat and transmits the signal to the processor 12 accordingly. Such systems include, but are not limited to, weight based sensors 20, electromagnetic spectrum-based sensing devices 22 (e.g., infrared detection sensors, lidar sensors), pressure sensors 24, strain sensors 26, electric sensors 28, piezoelectric sensors 30, safety restraint sensors 32, vision-based devices 34, and door actuation sensors 36. Such sensors detect a presence of the driver in the driver's seat. It should be understood that it is beneficial to detect whether a person is seated in the drivers seat as opposed to just an occupant in the vehicle. A person situated in the vehicle, but not seated in the driver's seat may not be able to place itself in a position to manually stop the vehicle before the vehicle executes an undesired movement. Moreover, even if a driver of a vehicle is not seated in the drivers seat (e.g., leaning over getting something out of the glove box) and the driver does not notice the vehicle is moving, such a detection is warranted by the system since vehicle movement may be unknown to the driver.

The at least one vehicle movement indication device 16 includes one or more devices that indicate whether the vehicle is moving or whether the vehicle is free-rolling (i.e., movement is not inhibited). Such devices include but are not limited to, transmission gear sensor 40, ignition sensor 42, wheel speed sensor 44, vehicle-based imaging device 46, global positioning device (GPS) 48, and road incline sensor 50. Each of the devices may be used individually or in combination to determine an imminent movement of the vehicle. For example, the wheel speed sensor 44, or the vehicle-based imaging device 46, or the GPS 48 may be used to determine whether the vehicle is actually moving by determining displacement of the vehicle over time. Other devices such as the transmission gear indicator 40, the ignition sensor 42, the road incline sensor 50, and the emergency brake indicator 52 identify whether vehicle devices are engaged to prevent the vehicle from moving or not engaged which would allow the vehicle to freely move, if acted on by an outside force. Logic may be performed by the processor 12 that analyzes a state of the various devices and determines whether imminent movement of the vehicle is likely. For example, if the driver is not detected in the driver's seat and the transmission gear indicator 40 indicates that the transmission is out of park and the road incline sensor 50 senses that the vehicle is on an incline, then the processor 12 would determine that imminent movement of the vehicle is very likely. If however, the emergency brake indicator 52 indicates that the emergency brake is on, then the processor 12 determines that precautions are already in place to prevent the vehicle from moving. As a result, the transmission being out of park position along with the determination of the absence of the driver in the drivers seat in cooperation with data from at least one of the other movement detection devices allows the processor 12 to determine the imminent movement status of the vehicle.

Vehicle movement prevention devices 18 may be actuated by the processor 12 or control signal may be transmitted from the processor 12 to a controlling device that actuates the vehicle movement prevention devices 18. Vehicle movement preventions devices 18 include, but are not limited to, braking devices 60 and gear shift devices 62.

Braking devices 60 are actuated through vehicle systems that include, but are not limited to, anti-lock braking system, brake-by-wire braking systems, electronic braking system or any other system that can autonomously (i.e., without the aide of the driver) actuate the vehicle brakes.

Gear shift devices 62 include gearing operations that may be actuated via an autonomous gear shift system, such as electronic shifting. In electronic shifting, the transmission gears may be autonomously shifted to engage the transmission park position for preventing movement of the vehicle.

Figure 2:
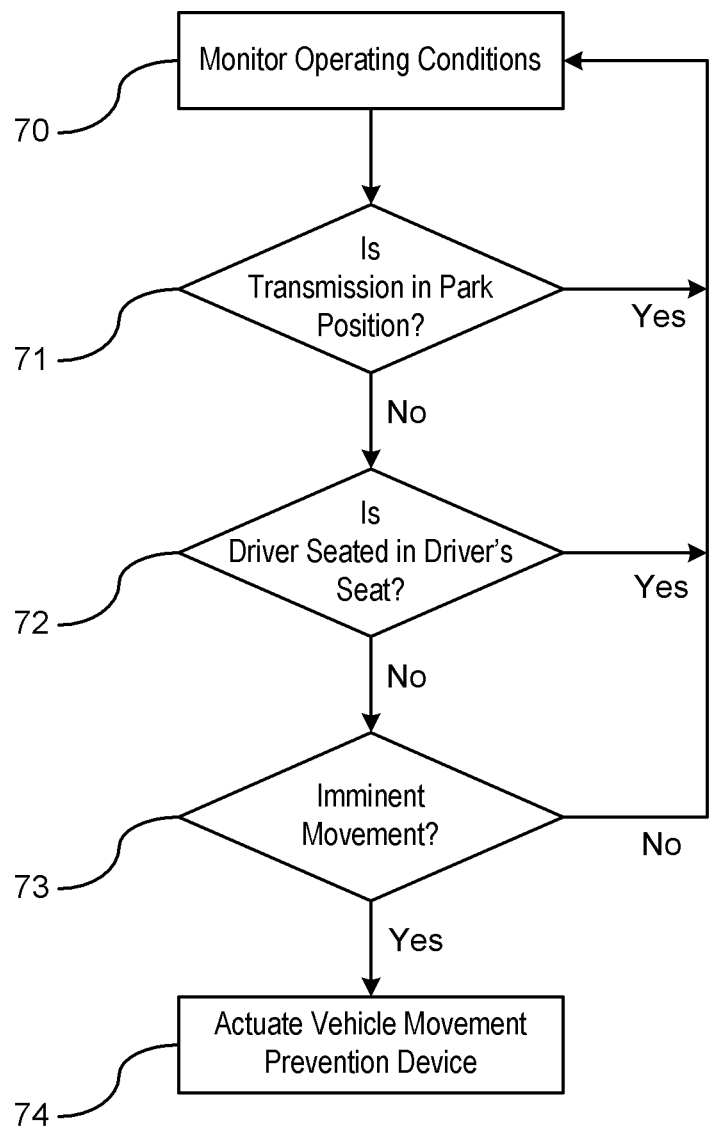
FIG. 2 is a block flow diagram of a method for deterring undesired movement of a vehicle.

FIG. 2 illustrates a block flow diagram for deterring undesired movement of a vehicle.

In block 70, a vehicle movement prevention routine is initiated. Vehicle operating conditions of the vehicle are monitored.

In block 71, a determination is made whether the vehicle transmission is in a park position or an out-of-park position. This may be determined by a conventional transmission sensor that senses whether vehicle transmission is in the park position. If the vehicle transmission is in the park position, then the routines returns to block 70 where the vehicle continues to monitor for an out-of-park condition; otherwise, the routine proceeds to block 72.

In block 72, in response to the vehicle transmission being in an out-of-park position, a determination is made by an occupant detection device whether a driver is seated in the driver seat. This may be performed by analyzing data from one or more devices. For example, both seat occupancy sensing and a driver's door are monitored. If the occupant sensing device suddenly determines that the driver is no longer located in the drivers seat, but there has been no signal that a vehicle door has been opened or closed within a set amount of time (e.g., 1 second) after no driver is sensed, then the system may temporarily monitor the drivers seat to see if the driver returns to the seat. A driver temporarily leaving the seat may be the result of the driver leaning over to get something in another seat, or may be due to the driver temporarily propping oneself up (e.g., straightening a coat or a skirt beneath them). If the occupant sensing device does not sense the person within a predetermined period of time (e.g., 2 seconds), then the routine proceeds to block 73; otherwise, if the occupant sensing device does sense the driver in the driver's seat, then a return is made to block 70 to continue to monitor the vehicle operating conditions. It should be understood that if the system senses the driver of the vehicle in the driver's seat, then the driver remains in full control over the vehicle.

In block 73, a determination is made as to whether imminent movement of the vehicle is present. Imminent movement as used herein is defined as actual movement of the vehicle or a likelihood of movement of the vehicle that may occur as a function of various factors that include, but are not limited to, that the vehicle transmission is not in the park position and a driver is not seated in the driver's seat. Various factors may indicate that the vehicle is currently moving, such as monitoring the wheel speed sensor and sensing movement of the wheel over a respective distance in a respective amount of time, or may be determined based on displacement of scenes as captured by a vehicle video capture device, by a GPS device, or by the ignition system engages/engine running condition. Other devices may identify a potential for the vehicle to move such as the vehicle being parked on an incline. Various other devices, such as the state of engagement of the emergency brake may increase likelihood of the vehicle potentially moving if not engaged or may decrease the likelihood that the vehicle may move based on the emergency brake engaged. If the determination is made that the imminent movement of the vehicle is present, then the routine proceeds to block 74, otherwise the routine proceeds to block 70 to continue monitoring vehicle operating conditions.

In block 74, in response to the determination of imminent movement of the vehicle being present, the vehicle enables a vehicle movement prevention device. It should be understood that the term vehicle movement prevention device may include a system wherein a group of components cooperatively function as a unit to perform the action. The respective devices may include brake actuation devices wherein pressure is autonomously applied to the vehicle brakes for locking each of the wheels in place to prevent movement of the vehicle. This may be performed by ABS systems or brake-by-wire systems. The respective devices may further include autonomous gear shift systems, such as electronic shifting, where the transmission automatically places the transmission into the park position. Any autonomous vehicle device/system can be used for preventing movement of the vehicle without the driver having to manually engage the brake pedal, the gear shift mechanism, or emergency brake.

It should also be understood that if the user is outside of the vehicle and observes imminent movement of the vehicle, the user may utilize a remote control (e.g., key fob) to actuate one of the vehicle movement prevention devices to prevent movement of the vehicle.

While certain embodiments of the present invention have been described in detail, those familiar with the art to which this invention relates will recognize various alternative designs and embodiments for practicing the invention as defined by the following claims.

What is claimed is:

1. A method for deterring undesired movement of a vehicle, the method comprising the steps of:

sensing whether a vehicle transmission is out of a park position;

determining a non-presence of a driver in a driver seat of the vehicle by an occupant detection system in response to the vehicle transmission being out of the park position;

determining that the vehicle is positioned on an inclined surface;

determining that the vehicle is stationary, but that movement of the vehicle may occur in response to the determination of the non-presence of the driver, the transmission being in the out of park position, and the vehicle being positioned on the inclined surface; and actuating a vehicle movement prevention device for preventing movement of the vehicle in response to the determination that movement of the vehicle is likely to occur.

2. The method of claim 1 wherein a road incline sensor determines whether the vehicle is on the inclined surface.

3. The method of claim 1 wherein determining whether movement of the vehicle is likely to occur is further a function of an emergency brake not engaged.

4. The method of claim 1 wherein the movement prevention device includes vehicle brakes of a vehicle braking system, wherein the vehicle brakes are autonomously engaged by the braking system for preventing movement of the vehicle.

5. The method of claim 1 wherein the movement prevention device includes an electronic shift transmission, wherein the electronic shift transmission autonomously actuates the vehicle transmission to the park position.

6. The method of claim 1 wherein determining the likelihood of whether movement of the vehicle may occur is further a function of the vehicle transmission being in an out of park position and determining that an engine of the vehicle is operating.

7. The method of claim 1 further comprising the step of actuating a remote control device by a user remote from the vehicle for actuating the vehicle movement prevention device.

8. The system of claim 7 wherein the step of actuating the remote control device includes actuating a wireless key fob by the user remote from the vehicle that enables the vehicle movement prevention device.

9. A movement prevention system for a vehicle, the system comprising:

a transmission gear sensor sensing an out of park position of a vehicle transmission;

an occupant detection system sensing a non-presence of a driver in a driver seat of the vehicle in response to the vehicle transmission being out of the park position;

a vehicle-based road incline sensor sensing that the vehicle is on an inclined surface;

a processor determining that the vehicle is stationary, but that movement of the vehicle may occur in response to the determination of the non-presence of the driver and the determination that the vehicle is on the inclined surface; and a vehicle movement prevention device preventing movement of the vehicle in response to the processor determining that movement of the vehicle is likely to occur.

10. The system of claim 9 wherein the movement prevention device includes an anti-lock braking system and vehicle brakes, wherein the vehicle brakes are autonomously engaged by the anti-lock braking system for preventing movement of the vehicle.

11. The system of claim 9 wherein the movement prevention device includes an electronic shift transmission, wherein the electronic shift transmission autonomously actuates the vehicle transmission to the park position.

12. The system of claim 9 wherein the processor determining an imminent movement of a vehicle is further in response to determining that an engine of the vehicle is operating.

13. The system of claim 12 further comprising an emergency parking brake, wherein the processor determining an imminent movement of a vehicle is further in response to the emergency parking brake not engaged.

14. The system of claim 9 further comprising a remote control device, wherein the remote control device is actuated by a user remote from the vehicle that enables the vehicle movement prevention device.

15. The system of claim 14 wherein the remote control device includes a wireless key fob, wherein the wireless key fob is actuated by a user remote from the vehicle that enables the vehicle movement prevention device.

16. A method comprising:

sensing an out of park position of a vehicle transmission;

determining a non-presence of a driver in a driver seat by an occupant detection system in response to the sensed out of park position;

determining that the vehicle is positioned on an inclined surface;

determining that the vehicle is stationary, but that movement of the vehicle may occur in response to determining a non-presence of the driver and the vehicle being positioned on the inclined surface;

actuating a vehicle movement prevention device for preventing movement of the vehicle in response to the likelihood of vehicle movement.

* * * * *